(12) United States Patent
Yahagi et al.

(10) Patent No.: US 9,530,993 B2
(45) Date of Patent: Dec. 27, 2016

(54) BATTERY HOLDING DEVICE

(75) Inventors: Hiroaki Yahagi, Tokyo (JP); Takanori Sato, Tokyo (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 960 days.

(21) Appl. No.: 13/542,508

(22) Filed: Jul. 5, 2012

(65) Prior Publication Data

US 2013/0017426 A1  Jan. 17, 2013

(30) Foreign Application Priority Data

Jul. 15, 2011  (JP) .................................. 2011-157224

(51) Int. Cl.
*H01M 2/10* (2006.01)
*H01M 2/20* (2006.01)
*H04M 1/02* (2006.01)

(52) U.S. Cl.
CPC ............. *H01M 2/1055* (2013.01); *H01M 2/20* (2013.01); *H04M 1/0262* (2013.01); *H01M 2220/30* (2013.01)

(58) Field of Classification Search
CPC  H01M 2/1055; H01M 2/1044; H01M 2/1066; H01M 2220/30; H01M 1/0262
USPC .................................. 429/96, 97, 98, 99, 100
See application file for complete search history.

(56) References Cited

U.S. PATENT DOCUMENTS 5,505,635 A * 4/1996 Willows et al. .............. 439/500
2003/0211382 A1 * 11/2003 Aoyama ......................... 429/96

FOREIGN PATENT DOCUMENTS

JP  2000-123885 A  4/2000
JP  2004-71509 A   3/2004
JP  4138191 B2    6/2008

OTHER PUBLICATIONS

Japanese Office Action for the related Japanese Patent Application No. 2011-157224 dated Jun. 17, 2014.

* cited by examiner

*Primary Examiner* — Eugenia Wang
(74) *Attorney, Agent, or Firm* — Pearne & Gordon LLP

(57) ABSTRACT

A battery holding device includes: a battery housing portion which is adapted to house a battery; and a conductive terminal which is disposed in a sidewall portion of the battery housing portion, and which is to be in contact with an electrode terminal of the battery. The sidewall portion of the battery housing portion is formed with: a first cutout that is formed along a first direction; and a second cutout that is formed along a second direction different from the first direction and that communicates with the first direction.

4 Claims, 7 Drawing Sheets

BATTERY HOLDING DEVICE

BACKGROUND OF THE INVENTION

The present invention relates to a battery holding device.

Batteries have advantages such as excellent portability, and therefore are used as power supplies for various apparatuses. Recently, miniaturization of an electronic apparatus rapidly advances, and many portable electronic apparatuses in which batteries are used as a power supply have been developed.

On the other hand, when batteries are used for a predetermined period of time, their lives are expired, and therefore must be replaced with new ones or recharged. Consequently, batteries of which lives are expired are detached from an electronic apparatus, and fresh batteries are mounted in the electronic apparatus.

Usually, batteries are housed in a battery holding device of an electronic apparatus. A battery holding device includes: positive conductive terminals which are to be contacted with the positive terminals of batteries to introduce the positive potential; and negative conductive terminals which are to be contacted with the negative terminals of the batteries to introduce the negative potential. In many battery holding devices, each of negative conductive terminals is configured by an elastic member such as a spring, and a contacting portion of the negative conductive terminal is urged by the elastic member to swing, whereby the contacting portion of the negative conductive terminal is pressingly contacted with a negative terminal. In a battery holding device having such a structure, a battery is housed by pressingly inserting the positive terminal into the battery holding device so as to be contacted with one of the positive conductive terminals, while the negative terminal is pressed against the contacting portion of the corresponding one of the negative conductive terminals (for example, see Japanese Patent No. 4138191).

The battery holding device disclosed in Japanese Patent No. 4138191 includes a structure in which an engaging portion that engages a contacting portion of a negative conductive terminal with a sidewall portion of the battery holding device is disposed to suppress the contacting portion of the negative conductive terminal from largely protruding in a direction along which the contacting portion separates from the sidewall portion.

In the battery holding device disclosed in Japanese Patent No. 4138191, however, the movement of the contacting portion of the negative conductive terminal in a direction intersecting with the swinging direction of the contacting portion of the negative conductive terminal is limited by the disposition of the engaging portion. In the case where the negative terminal is inserted into the battery holding device from a direction intersecting with the swinging direction of the contacting portion of the negative conductive terminal while pressing the positive terminal against the positive conductive terminal, therefore, there is a fear that the negative conductive terminal may be broken.

SUMMARY

This invention provides a battery holding device in which, even when the negative terminal of a battery is inserted into the battery holding device from a direction intersecting with a swinging direction of a contacting portion of a negative conductive terminal, the negative conductive terminal is hardly broken.

One aspect of the invention provides a battery holding device comprising: a battery housing portion which is adapted to house a battery; and a conductive terminal which is disposed in a sidewall portion of the battery housing portion, and which is to be in contact with an electrode terminal of the battery, wherein the sidewall portion of the battery housing portion is formed with: a first cutout that is formed along a first direction; and a second cutout that is formed along a second direction different from the first direction and that communicates with the first direction.

When the conductive terminal is pressed by the electrode terminal of the battery, the conductive terminal may be elastically deformed in the first direction along which the first cutout is formed in the sidewall portion of the battery housing potion.

The battery housing portion may be adapted to house the battery at a predetermined position. When the battery is housed at the predetermined position, the conductive terminal, which is elastically deformed, may be retracted in the first cutout. When the electrode terminal of the battery presses the conductive terminal in the second direction, before the battery is housed at the predetermined position, the conductive terminal may be retracted in the second cutout.

The second direction along which the second cutout is formed in the sidewall portion of the battery housing potion may be a lateral direction with respect to a longitudinal direction of the battery when the battery is housed at the predetermined position.

The battery housing portion may be provided with a separating portion which is adapted to separate a plurality of adjacently housed batteries from each other. The separating portion may include: a first separating portion which is projectingly formed along a longitudinal direction of the housed batteries; and a second separating portion which is projectingly formed on a middle part of the first separating portion.

The conductive terminal may include: a contacting portion which is to be in contact with the electrode terminal of the battery; and a plurality of coil-like portions which urge the contacting portion in a direction along which the contacting portion separates from the sidewall portion. The first cutout and the second cutout may communicate with a space between the plurality of coil-like portions.

The sidewall portion of the battery housing portion may be formed with the first cutout and the second cutout below the conductive terminal.

DETAILED DESCRIPTION OF EMBODIMENTS

Figure 1:
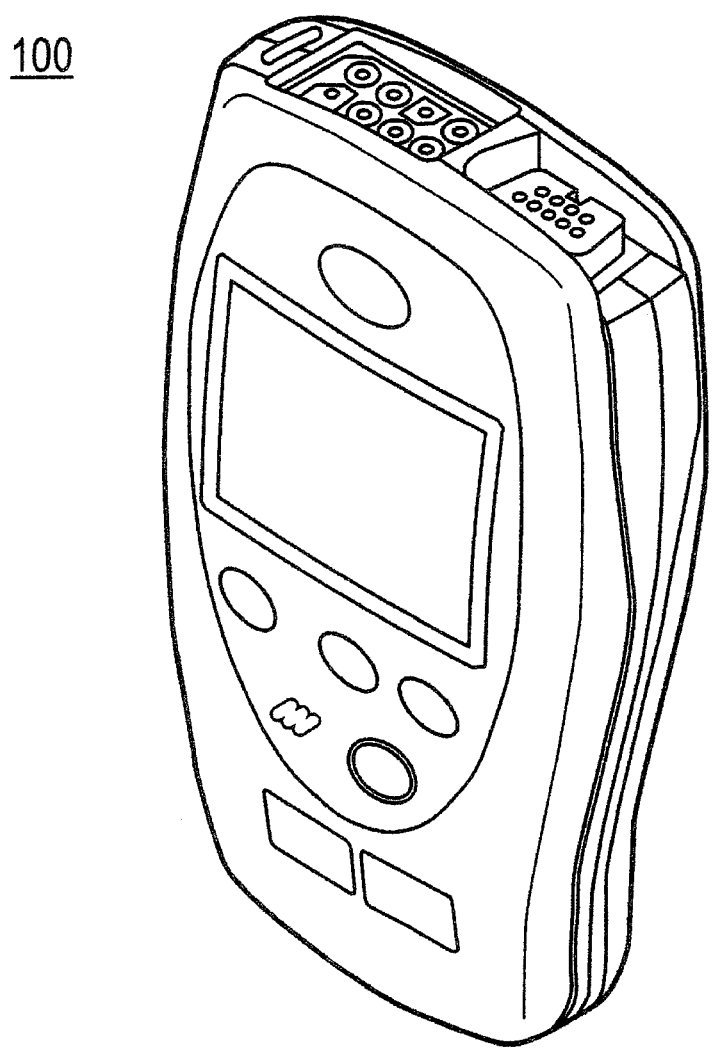
FIG. 1 is an external view illustrating a biological information transmitter having a battery holding device of a first embodiment of the invention.

Hereinafter, embodiments of the battery holding device of the invention will be described with reference to the accompanying drawings. In the figures, the identical components are denoted by the same reference numerals. In the drawings, the dimension ratios are exaggerated for the sake of convenience in description, and may be sometimes different from the actual ratios. Hereinafter, cases where the battery holding device of the invention is applied to a biological information transmitter will be exemplarily described. However, the battery holding device of the invention is not limited to cases where the battery holding device is applied to a biological information transmitter, and can be applied also to an electronic apparatus other than a biological information transmitter.

First Embodiment

FIG. 1 is an external view of a biological information transmitter having a battery holding device of a first embodiment of the invention. The battery holding device of the biological information transmitter can include a second cutout. The second cutout is disposed in which a negative conductive terminal that is elastically deformable in an arbitrary direction along which the terminal is pressed by the negative terminal of a battery can be retracted.

The biological information transmitter 100 of the embodiment shown in FIG. 1 is a portable biological information transmitter, and attached to clothes or the like of the patient in, for example, a hospital to sequentially wireless transmit biological information such as the blood pressure, heart rate, and arterial oxygen saturation of the patient, to a nurse's station.

In the nurse's station, a dedicated central monitor (not shown) receives the biological information transmitted from the biological information transmitter 100, and a medical person such as a nurse monitors the received biological information. Even in the case where an abnormality occurs in the biological information of the patient when, for example, the nurse in charge does attend to the patient, therefore, another nurse in the nurse's station can know the abnormality in the biological information of the patient, and adequate medical procedures can be conducted on the patient.

Figure 2A:
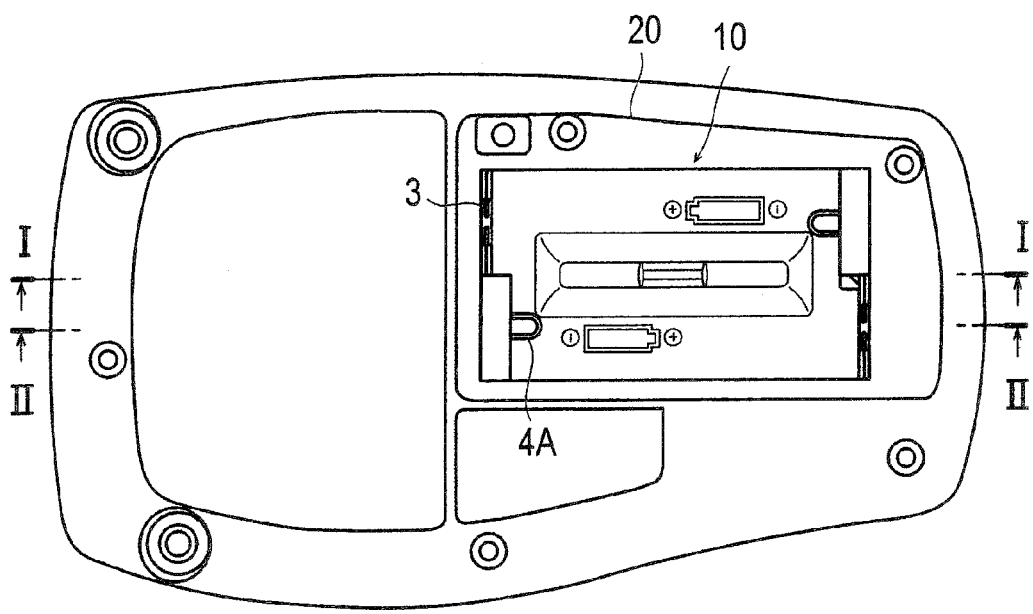
FIG. 2A is a back view of the biological information transmitter shown in FIG. 1.
Figure 2B:
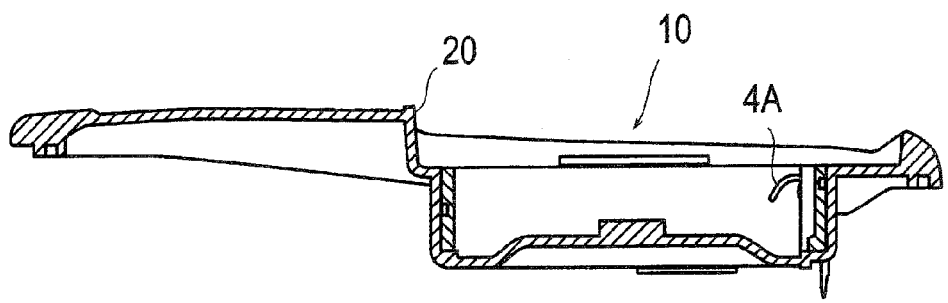
FIG. 2B is a sectional view of the biological information transmitter taken along line I-I shown in FIG. 2A.

Hereinafter, the battery holding device of the embodiment will be described with reference to FIGS. 2A and 2B. FIG. 2A is a back view of the biological information transmitter shown in FIG. 1, and FIG. 2B is a sectional view of the biological information transmitter taken along line I-I shown in FIG. 2A. FIG. 2B shows a section of a case back panel of the biological information transmitter including the battery holding device.

As shown in FIGS. 2A and 2B, the battery holding device 10 is disposed in an opening portion 20 of the case back of the biological information transmitter 100, and the opening portion 20 is hermetically closed by a lid portion which is not shown. When the biological information transmitter 100 is to be used, the opening portion 20 is hermetically closed by the lid portion, whereby the battery holding device 10 can be protected from moisture ingress. By contrast, when the lid portion is detached from the opening portion 20, batteries can be replaced with other ones through the opening portion 20.

In the embodiment, positive and negative terminals which are directed to the upper side in FIG. 2A are electrically connected to each other, and the two batteries are connected in series. Therefore, a voltage which is a sum of the voltages of the two batteries appears across the negative and positive terminals which are directed to the lower side. The voltage is supplied via a power supply section of the biological information transmitter 100 to components such as a calculating section, a displaying section, an operating section, and a communication interface section through wirings.

Figure 3:
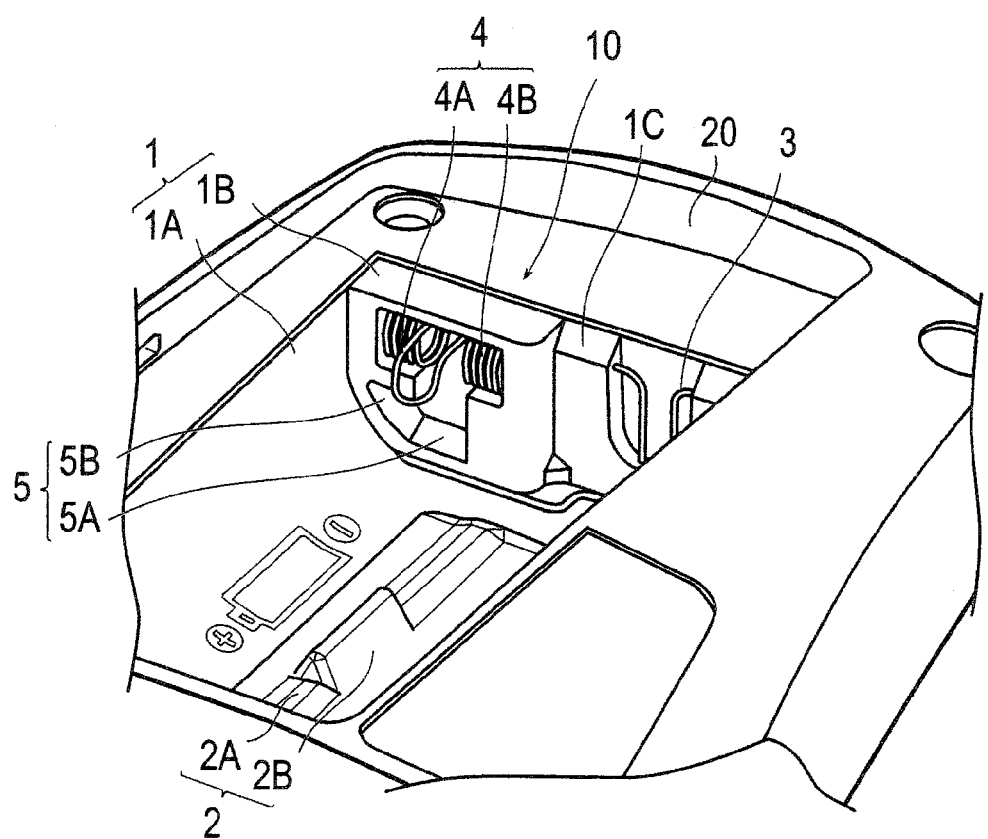
FIG. 3 is a view of an opening portion shown in FIG. 2A as viewed from the upper left part of the sheet to the lower right part.

Referring to FIG. 3, next, the battery holding device of the embodiment will be described in more detail. FIG. 3 is a view of the opening portion shown in FIG. 2A as viewed from the upper left part of the sheet to the lower right part.

As shown in FIG. 3, the battery holding device 10 can include a battery housing portion 1, a separating portion 2, positive conductive terminals 3, and negative conductive terminals 4.

The battery housing portion 1 houses batteries at predetermined positions. In the embodiment, the battery housing portion 1 is formed by, for example, a resin to be integrated with the case of the biological information transmitter 100. The battery housing portion 1 can include a casing portion 1A and first and second sidewall portions 1B, 1C.

The casing portion 1A is curvedly formed along the section shapes of two batteries which are adjacently housed, to cover the side faces of the two housed batteries. The first and second sidewall portions 1B, 1C vertically extend from the bottom of the casing portion 1A toward the back of the case of the biological information transmitter 100, and define the longitudinal positions of the housed batteries. The first sidewall portions 1B are formed projectingly toward the inside of the battery housing portion 1 with respect to the second sidewall portions 1C. The first sidewall portions 1B prevent coil-like portions 4B (described later) from being collapsed when batteries are inserted. The first and second sidewall portions 1B, 1C may be formed by a resin to be integrated with the casing portion 1A, or formed by a resin to be independent from the casing portion 1A, and then bonded to the casing portion 1A by an adhesive agent or the like. In the embodiment, a cutout 5, which includes a first cutout 5A and a second cutout 5B is formed in each of the first sidewall portions 1B. The first cutout 5A and the second cutout 5B will be described later.

The separating portion 2 is formed on the casing portion 1A, and separates the two adjacently housed batteries from each other. The separating portion 2 has a first separating portion 2A and a second separating portion 2B.

The first separating portion 2A is formed projectingly on the casing portion 1A along the longitudinal direction of two housed batteries. The first separating portion 2A separates the two adjacently housed batteries from each other, and defines the positions of the batteries in the short-side direction in the battery housing portion 1.

The second separating portion 2B is formed projectingly on a middle part of the first separating portion 2A in the longitudinal direction, so as to have a triangular sectional shape. The length of the second separating portion 2B in the longitudinal direction is shorter than that of the first separating portion 2A in the longitudinal direction. On the second separating portion 2B, therefore, a battery which is inserted into the battery housing portion 1 cannot maintain a horizontal state. A battery which strides the separating portion 2 cannot be in a horizontal state, and therefore the negative terminal of the battery cannot horizontally turn and laterally press the negative conductive terminals 4. Even in a state where the level of the negative terminal of the battery is lowered, on the side of one of the negative conductive terminals 4 shown in FIG. 3, the battery can be prevented from entering below a contacting portion 4A of the negative conductive terminal 4, because the second separating portion 2B has a height above the bottom.

The separating portion 2 may be formed integrally with the casing portion 1A, or separately from the casing portion 1A.

In the embodiment, the two pairs of the positive and negative conductive terminals 3, 4 are disposed on the opposing short side faces of the battery housing portion 1, respectively, and configured in a similar manner. For the sake of simplicity, hereinafter, description will be made mainly on only one of the pairs of the positive and negative conductive terminals 3, 4.

The positive conductive terminal 3 is to be contacted with the positive terminal of a housed battery to introduce the positive potential of the battery. In the embodiment, the positive conductive terminal 3 is disposed in a recess in the second sidewall portion 1C, and to be contacted with the positive terminal of the housed battery. Specifically, the positive conductive terminal 3 is formed into a U-like shape by a metal wire member, to be surely contacted with a projecting portion of the positive terminal of the housed battery. In the embodiment, the positive conductive terminal 3 is disposed in the recess in the second sidewall portion 1C. In the case where a battery is inserted into the battery housing portion 1 in the state that the battery is oriented in incorrect (opposite) direction, therefore, the negative terminal of the battery can be prevented from being contacted with the positive conductive terminal 3.

The negative conductive terminal 4 is to be contacted with the negative terminal of a housed battery to introduce the negative potential of the battery. In the embodiment, the negative conductive terminal 4 is disposed on the first sidewall portion 1B, to be contacted with the negative terminal of the battery, and can be elastically deformed in an arbitrary direction along which the negative conductive terminal is pressed by the negative terminal of the battery.

More specifically, the negative conductive terminal 4 has the contacting portion 4A and the two coil-like portions 4B. As shown in FIG. 2A, the contacting portion 4A is formed by a metal wire member, and has a U-like shape as viewed from the back of the biological information transmitter 100. As shown in FIG. 2B, the contacting portion 4A has a part which is bent as viewed from the lateral side of the biological information transmitter 100. The negative terminal of a housed battery is contacted with the bent part.

In the contacting portion 4A, the distance between the root part and the bent part is determined in accordance with the setting of the pressing force which is applied to the negative conductive terminals 4 when a battery is inserted into the battery housing portion 1. In the case where the distance is set to be short, when a battery is to be inserted into the battery housing portion 1, a larger pressing force must be applied. When an operator inserts a battery into the battery housing portion 1, namely, the operator feels that the contacting portion is "stiff". By contrast, in the case where the distance is set to be long, when a battery is to be inserted into the battery housing portion 1, a smaller pressing force is sufficient to be applied. When the operator inserts a battery into the battery housing portion 1, namely, the operator feels that the contacting portion is "soft". In the embodiment, the part extending from the root part of the contacting portion 4A to the bent part is formed to be substantially horizontal.

The coil-like portions 4B are formed by winding a metal wire member, and urge the contacting portion 4A in the direction along which the portion separates from the first sidewall portion 1B. In the embodiment, a winding constituting each of the coil-like portions 4B is preferably formed by closely winding the metal wire member in order to enable the coil-like portion 4B to be suitably fitted into the first sidewall portion 1B.

The contacting portion 4A and the two coil-like portions 4B are configured by one metal wire member, and the contacting portion 4A is formed between the two coil-like portions 4B. The winding numbers of the coil-like portions 4B, and the thickness of the wire member are adequately determined in accordance with the required urging force. Alternatively, the contacting portion 4A and the two coil-like portions 4B may be formed separately from one another, and then joined together.

According to the above mentioned negative conductive terminal 4, the negative conductive terminal 4 is elastically deformed to urge the contacting portion 4A in the direction along which the contacting portion 4A separates from the first sidewall portion 1B, and therefore the contacting portion 4A of the negative conductive terminal 4 can be surely contacted with the negative terminal of a battery.

The first cutout 5A and the second cutout 5B are formed in the first sidewall portion 1B and are communicated with each other. The first cutout 5A is formed as an opening portion which is substantially rectangular, in a lower part of the negative conductive terminal 4. When a battery is housed at the predetermined position, the negative conductive terminal 4 which is elastically deformed by the pressure exerted by the negative terminal is retracted in the first cutout 5A. The first cutout 5A is preferably a substantially rectangular opening portion, or may have another shape.

On the other hand, the second cutout 5B is formed below the coil-like portions 4B of the negative conductive terminal 4 and on the lateral side of the first cutout 5A. The second cutout 5B is tapered along the shape of the casing portion 1A in the direction from the first cutout 5A toward an edge part of the first sidewall portion 1B. In the case where, before a battery is housed at the predetermined position, the negative terminal presses the negative conductive terminal 4 in a direction that is different from that toward the first cutout 5A, the negative conductive terminal 4 can be retracted in the second cutout 5B. Specifically, in the case where the negative terminal of a battery presses the negative conductive terminal 4 from the upper right part of the negative conductive terminal 4 in FIG. 3 toward the lower left part, the negative conductive terminal 4 can be moved toward the second cutout 5B to be retracted therein. The second cutout 5B is not limited to have the above-described shape, and may have another shape as far as the negative conductive terminal 4 can be retracted without being caught by the second cutout 5B.

In the contacting portion 4A of the negative conductive terminal 4, the distance between the bent part and the tip end is set so that, when the negative conductive terminal 4 is retracted in the first cutout 5A, the tip end of the contacting portion 4A of the negative conductive terminal 4 is not contacted with the bottom of the first cutout 5A. In a state where a battery is housed in the battery housing portion 1, namely, a predetermined gap is set between the tip end of the contacting portion 4A of the negative conductive terminal 4 and the bottom of the first cutout 5A. A predetermined gap is set also between the tip end of the contacting portion 4A of the negative conductive terminal 4 and the bottom of the second cutout 5B so that, when the negative conductive terminal 4 is retracted in the second cutout 5B, the tip end of the contacting portion 4A of the negative conductive terminal 4 is not contacted with the bottom of the second cutout 5B.

In the first sidewall portion 1B, the second cutout 5B is formed only in the part opposite to the side where another adjacently housed battery is to be placed, i.e., in the left side of the first sidewall portions 1B shown in FIG. 3. This is because there is the space for housing the other battery and hence the negative conductive terminal 4 is easily pressed from the side where the other battery exists.

The first and second cutouts 5A, 5B further communicate with the space between the two coil-like portions 4B. As compared with a case where the two coil-like portions 4B are separated from each other by a member, therefore, the negative conductive terminal 4 can be elastically deformed in an easier manner.

As described above, the negative conductive terminal 4 can be elastically deformed to a lateral side with respect to the longitudinal direction of a battery which is housed at the predetermined position, and the second cutout 5B is formed on a lateral side to which the negative conductive terminal 4 can be elastically deformed, with respect to the first cutout 5A. Even in the case where the negative terminal is inserted into the battery holding device 10 from a direction intersecting with the swinging direction of the contacting portion 4A of the negative conductive terminal 4, therefore, the negative conductive terminal 4 is hardly broken.

Next, the function of the battery holding device of the embodiment will be described with reference to FIGS. 4A to 6B. In the following description, in order to describe the function of the battery holding device of the embodiment, a procedure which is different from a usual procedure of housing a battery in the battery holding device, i.e., a case where a battery is housed in an erroneous procedure will be described.

Figure 4A:
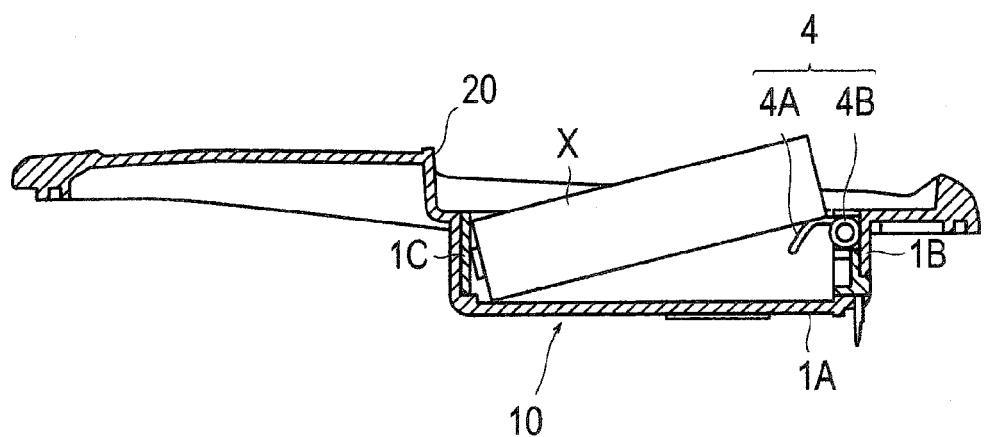
FIG. 4A is a view which, by using a sectional view of the biological information transmitter taken along line II-II shown in FIG. 2A, illustrates a stage where a negative conductive terminal begins to be pressed by a negative terminal.
Figure 4B:
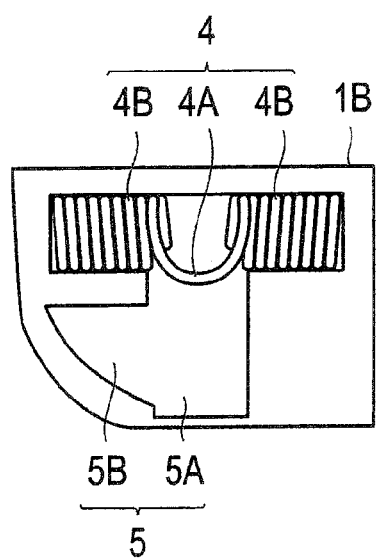
FIG. 4B is a view illustrating the operation of the negative conductive terminal in the stage shown in FIG. 4A.
Figure 5A:
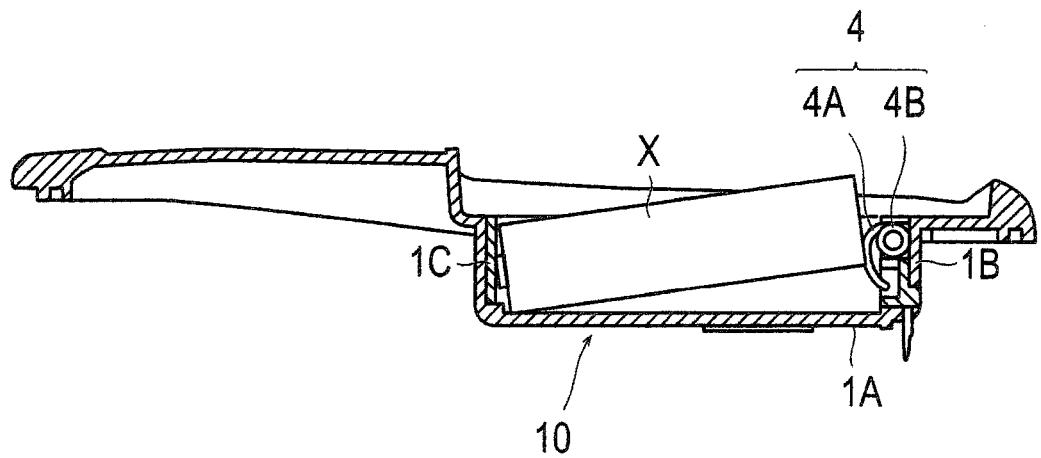
FIG. 5A is a view illustrating a stage where the negative conductive terminal is pressed by the negative terminal.
Figure 5B:
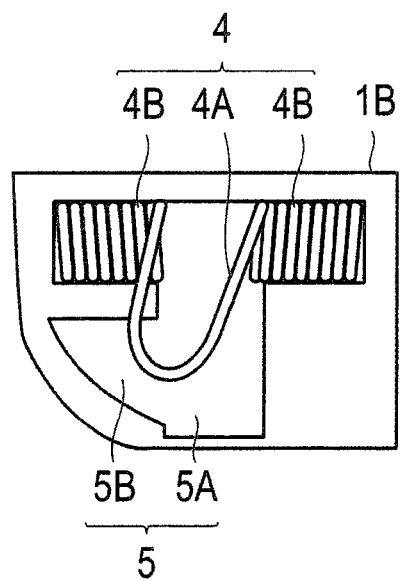
FIG. 5B is a view illustrating the operation of the negative conductive terminal in the stage shown in FIG. 5A.
Figure 6A:
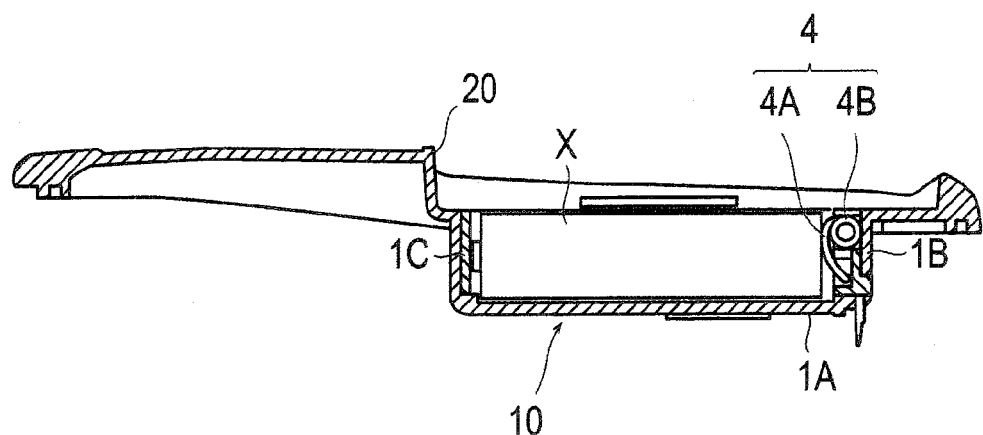
FIG. 6A is a view illustrating a stage where a battery is housed in the battery holding device.
Figure 6B:
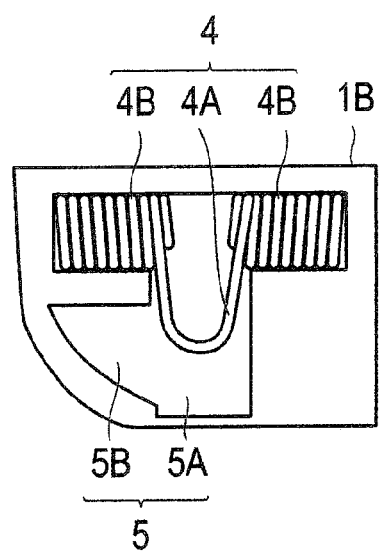
FIG. 6B is a view illustrating the operation of the negative conductive terminal in the stage shown in FIG. 6A.

FIGS. 4A to 6B are views illustrating the operation of the negative conductive terminal when a battery is to be housed in the battery holding device of the first embodiment of the invention. FIG. 4A is a view which, by using a sectional view of the biological information transmitter taken along line II-II shown in FIG. 2A, illustrates a stage where the negative conductive terminal begins to be pressed by the negative terminal, and FIG. 4B is a view illustrating the operation of the negative conductive terminal in the stage shown in FIG. 4A. FIG. 5A is a view illustrating the stage where the negative conductive terminal is pressed by the negative terminal, and FIG. 5B is a view illustrating the operation of the negative conductive terminal in the stage shown in FIG. 5A. FIG. 6A is a view illustrating a stage where a battery is housed in the battery holding device, and FIG. 6B is a view illustrating the operation of the negative conductive terminal in the stage shown in FIG. 6A. In FIGS. 4B, 5B, and 6B, the battery is not shown.

As shown in FIGS. 4A and 4B, the positive terminal of a battery X is inserted toward the positive conductive terminal 3 disposed in the opposite second sidewall portion 1C, and thereafter the negative terminal of the battery X is pressed toward the bottom of the casing portion 1A. In the stage where the negative terminal of the battery X begins to be pressed, the negative conductive terminal 4 is not yet elastically deformed.

As shown in FIG. 5A, not only that the negative terminal of the battery X is pressed toward the bottom of the casing portion 1A, but also that the negative terminal is pressed from the front side of the sheet of the sectional view shown in FIG. 5A toward the rear side of the sheet. As a result, the negative conductive terminal 4 is elastically deformed toward the first cutout 5A, and at the same time also from the front side toward the rear side. As shown in FIG. 5B, the contacting portion 4A of the negative conductive terminal 4 which is elastically deformed is retracted in the second cutout 5B. Therefore, the contacting portion 4A of the negative conductive terminal 4 can be prevented from being contacted with the first sidewall portion 1B to be broken.

As shown in FIG. 6A, next, the battery X is housed at the predetermined position of the battery housing portion 1. At this time, the contacting portion 4A of the negative conductive terminal 4, which has been retracted in the second cutout 5B, receives a restoring force directed from the rear side of the sheet toward the front side in the sectional view shown in FIG. 6A, and, as shown in FIG. 6B, is moved to the first cutout 5A to be retracted therein.

According to the battery holding device 10 of the embodiment, as described above, the negative conductive terminal 4 that is elastically deformed in the direction along which the terminal is pressed by the negative terminal of the battery X is retracted in the second cutout 5B. Even in the case where the negative terminal of the battery is inserted into the battery holding device 10 from a direction intersecting with the swinging direction of the contacting portion 4A of the negative conductive terminal 4, therefore, the negative conductive terminal 4 is hardly broken. As a result, the failure rate of the battery holding device 10 is lowered.

According to the battery holding device 10 of the embodiment, moreover, the second separating portion 2B is formed in addition to the first separating portion 2A, and therefore the battery X cannot be horizontally placed on the second separating portion 2B. As a result, the negative terminal of the battery cannot horizontally turn and laterally press the negative conductive terminals 4. Since the second separating portion 2B has a height above the bottom, the battery can be prevented from entering below the contacting portion 4A of the negative conductive terminal 4.

Second Embodiment

In a second embodiment, a case where second cutouts are formed in the both sides in the first sidewall portion, respectively will be described. In order to avoid duplicate description, description of configurations which are similar to those of the first embodiment will be omitted.

Figure 7:
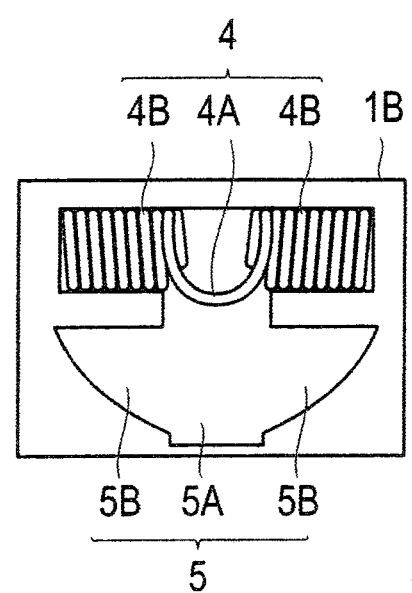
FIG. 7 is a view illustrating second cutouts of a battery holding device of a second embodiment of the invention.

FIG. 7 is a view illustrating the second cutouts of the battery holding device of the second embodiment of the invention.

In the embodiment, as shown in FIG. 7, the second cutouts 5B are formed not only in the left side in the first sidewall portion 1B but also in the right side. In the case where the second cutouts 5B are formed in the both sides in the first sidewall portion 1B, when the negative conductive terminal 4 is pressed from the left side of the sheet of FIG. 7 toward the right side of the sheet, the contacting portion 4A of the negative conductive terminal 4 can be retracted in the right second cutout 5B of the first sidewall portion 1B. Therefore, the contacting portion 4A of the negative conductive terminal 4 can be prevented from being contacted with the first sidewall portion 1B to be broken.

As described above, the battery holding devices of the first and second embodiments of the invention have been described. In the invention, however, it is a matter of course that those skilled in the art can adequately perform addition, modification, and deletion within the scope of the technical concept of the invention.

In the first and second embodiments, for example, the configuration where the negative conductive terminal which is elastically deformable is pressed by a negative terminal, and the negative conductive terminal is retracted in the second cutout has been described. In the battery holding device of the invention, however, a configuration where the positive conductive terminal which is elastically deformable is pressed by a positive terminal, and the positive conductive terminal is retracted in the second cutout may be employed.

In the first and second embodiments, the battery holding device which houses two batteries has been exemplarily described. However, the invention can be applied also to a battery holding device which houses one or three or more batteries. In the case of a battery holding device which houses three batteries, for example, second cutouts are formed respectively in the both sides of the first sidewall portion corresponding to the center one of the three juxtaposed batteries, in a similar manner as the second embodiment.

In the first and second embodiments, size AA batteries have been exemplarily described as the batteries. However, batteries useful in the battery holding device of the invention are not limited to size AA batteries, and cylindrical batteries including batteries ranging from size D to size N may be used.

According to an aspect of the invention, the negative conductive terminal which is elastically deformed in the direction along which it is pressed by the negative terminal is retracted in the second cutout. Even when the negative terminal is inserted into the battery holding device from the direction intersecting with the swinging direction of the contacting portion of the negative conductive terminal, therefore, the negative conductive terminal is hardly broken. As a result, the failure rate of the battery holding device is lowered.

What is claimed is:

1. A battery holding device comprising:
   a battery housing portion which is adapted to house a first battery and a second battery, the first battery to be housed at a predetermined position, the first battery and the second battery being adjacently housed according to a lateral direction, the lateral direction being perpendicular to a longitudinal direction of the first battery, wherein the extension of the first battery in the longitudinal direction is larger than the extension of the first battery in the lateral direction; and
   a conductive terminal which is disposed in a sidewall portion of the battery housing portion, and which is to be in contact with an electrode terminal of the first battery,
   wherein the sidewall portion of the battery housing portion is formed with:
      a first cutout that is formed along a first direction; and
      a second cutout that is formed along a second direction different from the first direction and that communicates with the first direction,
   when the conductive terminal is pressed by the electrode terminal of the first battery, the conductive terminal is elastically deformed in the first direction,
   when the first battery is housed at the predetermined position, the conductive terminal, which is elastically deformed, is retracted in the first cutout,
   when the electrode terminal of the first battery presses the conductive terminal in the second direction, before the first battery is housed at the predetermined position, the conductive terminal is retracted in the second cutout,
   the conductive terminal is elastically deformable to a side in the lateral direction with respect to the longitudinal direction of the first battery which is housed at the predetermined position, and
   the second cutout is formed only in a part that is the side in the lateral direction to which the conductive terminal is elastically deformable with respect to the first cutout and that is opposite to a side where the second battery is to be housed in the battery housing portion.

2. The battery holding device according to claim 1, wherein the battery housing portion is provided with a separating portion which is adapted to separate the first and second batteries from each other, and the separating portion includes:
   a first separating portion part which is projectingly formed along the longitudinal direction of the first battery and a longitudinal direction of the second battery; and
   a second separating portion part which is projectingly formed on a middle part of the first separating portion.

3. The battery holding device according to claim 1, wherein the conductive terminal includes:
   a contacting portion which is to be in contact with the electrode terminal of the first battery; and
   a plurality of coiled portions which urge the contacting portion in a direction along which the contacting portion separates from the sidewall portion, and
   the first cutout and the second cutout communicates with a space between the plurality of coiled portions.

4. The battery holding device according to claim 1, wherein the sidewall portion of the battery housing portion is formed with the first cutout and the second cutout below the conductive terminal.

* * * * *